(12) United States Patent
Heinberg et al.

(10) Patent No.: US 6,647,355 B2
(45) Date of Patent: Nov. 11, 2003

(54) TECHNIQUES FOR OBJECTIVELY MEASURING DISCREPANCIES IN HUMAN VALUE SYSTEMS AND APPLICATIONS THEREFOR

(75) Inventors: Paul Heinberg, Honolulu, HI (US); Mark Marabella, Honolulu, HI (US)

(73) Assignee: Proleamers, LLC, Honolulu, HI (US)

( * ) Notice: Subject to any disclaimer, the term of this patent is extended or adjusted under 35 U.S.C. 154(b) by 208 days.

(21) Appl. No.: 09/875,611

(22) Filed: Jun. 6, 2001

(65) Prior Publication Data

US 2002/0013676 A1 Jan. 31, 2002

Related U.S. Application Data

(60) Provisional application No. 60/209,818, filed on Jun. 6, 2000.

(51) Int. Cl.$^7$ .......................... G06F 17/60; G06F 101/14
(52) U.S. Cl. ............................................ 702/179; 705/10
(58) Field of Search ................................ 702/108, 127, 702/179–181; 705/10

(56) References Cited

U.S. PATENT DOCUMENTS

| | | | | |
|---|---|---|---|---|
| 5,109,789 A | * | 5/1992 | Berman | 116/325 |
| 5,754,938 A | * | 5/1998 | Herz et al. | 725/116 |
| 5,790,426 A | * | 8/1998 | Robinson | 702/179 |
| 6,052,122 A | * | 4/2000 | Sutcliffe et al. | 345/751 |
| 6,272,467 B1 | * | 8/2001 | Durand et al. | 705/1 |
| 6,457,005 B1 | * | 9/2002 | Torrey | 707/5 |

OTHER PUBLICATIONS

Steven R. Brown, The History and Principles of Q Methodology in Psychology and the Social Sciences, found Jun., 2001 at http://facstaff.uww.edu/cottlec/QArchive/Bps.htm.

* cited by examiner

Primary Examiner—Marc S. Huff
Assistant Examiner—Manuel L. Barbee
(74) Attorney, Agent, or Firm—Gordon E. Nelson

(57) ABSTRACT

Techniques for finding sets of values that are relevant to attaining desired results, determining discrepancies between how different entities regard a set of values, and employing the discrepancies to determine how well individuals "fit" with other individuals or communities, how well communities fit with each other, how an entity's values compare with a desired set thereof, how an entity's values change over time, and what progress an entity is making towards acquiring value hierarchies that are useful in attaining the desired results. All of the techniques involve having entities assign values to hierarchies, with the value's position in the hierarchy being represented by a rating number upon which arithmetic operations may be performed. Discrepancies between value systems may be determined by comparing the rating numbers which the entities assign the values. Values and ratings of them that are useful for attaining a desired result may be found by selecting values that appear to be useful for attaining the desired results and having sources rate the values and specify how well they have attained the desired result. Values and ratings with a high correlation to the desired result can thus be found and used to establish an ideal hierarchy of values for reaching the desired result. Hierarchies of values of entities may then be compared with the ideal hierarchy.

23 Claims, 7 Drawing Sheets

RULES FOR CONNECT 301

1) There are two forms to be filled out: an IDEAL OTHER form and a SELF form.
2) Your responses on these forms are strictly confidential. However, we do need to pair the forms that you fill out. Therefore, please enter a sequence of five letters and/or numbers in the ID box on each of the two forms. Please choose a sequence that no one is apt to identify as yours and is a sequence that you will remember when you are requested at a later time to fill out these same two forms again.
3) Please fill out the IDEAL OTHER form first, and then fill out the SELF form.
4) Each form is a pyramid that consists of 7 columns from the 1 column (least applicable) to the 7 column (most applicable).
5) There are 18 values to be entered on each form.
6) Place one and only one letter in each box, using each letter once and only once.
7) It makes no difference how high you place any letter in a column.
8) It is suggested that you place one of the values in the 1 column (least applicable) and one in the 7 column (most applicable), and then work towards the center.
9) Each letter refers to the definition, not to the label. The label for each stated value is merely a suggested label for that value.
10) After you have entered one letter in each box, check to make sure that you have used each letter once and only once.

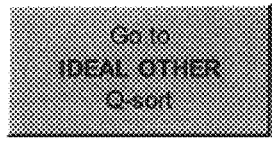
303

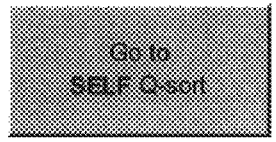
305

FIG 3

A—CREATIVE (conceiving & trying out various alternatives in various situations)
B—WISE (perceiving that future which most advances human evolution)
C—SERENE (perceiving the consequences of his/her actions as being extremely ethical)
D—SELF-KNOWING (perceiving self as a panel of wise psychologists of the future would perceive him/her)
E—PREDICTABLE (behaving consistently in various situations)
F—UNIQUE (being unique in his/her ideas & behavior in various situations)
G—HELPFUL (helping others to attain their specified purposes & goals)
H—CONTROLLING (suppressing deviations in various systems that he/she wants to suppress)
J—VENTURESOME (producing deviations in various systems to examine their consequences)
K—FREE (acting independently of others' influences as groups and individuals on him/her)

L—INTERDEPENDENT (forming & maintaining a close bond with one or more others)
M—POWERFUL (affecting the future of other individuals & groups)
N—EFFECTIVE (producing the events and actions that he/she attempts to produce)
P—PURPOSEFUL (specifying quite precisely those changes in the real world that he/she & others should strive to produce)
Q—EFFICIENT (producing desired changes with fewest resources of time, energy, money, etc.)
R—RESPECTED (being recognized by others for the importance of his/her contributions to our world)
S—FAMOUS (being recognized by future generations for the importance of his/her contributions to their world)
T—SUCCESSFUL (attaining during his/her life those purposes & goals which at this time he/she prefers to attain)

 Return to IDEAL OTHER Q-sort

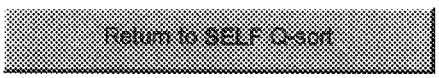 Return to SELF Q-sort

FIG. 4

TECHNIQUES FOR OBJECTIVELY MEASURING DISCREPANCIES IN HUMAN VALUE SYSTEMS AND APPLICATIONS THEREFOR

CROSS REFERENCES TO RELATED APPLICATIONS

The present application claims priority from U.S. provisional patent application No. 60/209,818, Heinberg and Marabella, Connect, a tool for forming communities, filed Jun. 6, 2000.

BACKGROUND OF THE INVENTION

1. Field of the Invention

The invention relates generally to measurement of characteristics of human beings that affect their behavior and relates more specifically to the objective measurement of discrepancies in human value systems. The measurements of the discrepancies are used to determine "fit" between human beings, between a human being and an organization, and between organizations, as well as to determine a human being's or an organization's progress in reaching its goals. The discrepancy measurement can be part of a larger process which determines what values an individual or organization desires, what values it presently has, and what needs to be done to acquire the desired values.

2. Description of Related Art

It has long been observed that people get along better if they have similar value systems. One expression of this observation is "birds of a feather flock together". Another is the substantial expense many parents go to send their children to colleges where they will meet members of the opposite sex who are "like them". A third is the tendency of organizations to hire people who are like the people that already work there.

A difficulty with making use of the observation that people get along better if they have similar value systems is that there has in the past been no good way to measure similarity or lack thereof in value systems. People have consequently used external clues to judge what someone's value system was—physical appearance, dress, mode of speaking, family ties, organizational membership, educational history, income level, and the like. While such clues are not without their value, they are not in themselves objective indicators of values, and in many cases they are not even objectively measurable, and people who use such clues are generally left with no more than a vague feeling that "she'll fit in here" or "he won't fit in here." In many cases, people who have looked like they would fit in haven't, and worse, many people who would in fact have fit in haven't been given a chance. All of this is bad enough when what is at stake is who to hire or what organization to join, but when what you are doing is choosing the person with whom you intend to spend the rest of your life, a mistake can be truly disastrous for everyone involved.

Another area where value systems are important is in organizations. How an organization behaves is determined by the organization's value system and by the degree to which the members of the organization have adopted that value system. No organization can change significantly without changing its value system and persuading its members to adopt the changed value system. The new value system must be one that is "reachable" given the old value system and the values of the organization's members, and there has to be a plan to get from the old value system to the new one. Determining whether the new value system is reachable, making a plan, and persuading the members to adopt the new value system are all made more difficult by the lack of any objective way to measure discrepancies in value systems.

It is thus an object of the present invention to provide objective techniques for determining the values in a value system, measuring discrepancies in human value systems, and to provide applications of those techniques in determining the "goodness of fit" between individuals, between individuals and organizations, and between organizations, in measuring changes in values over time, and in determining the progress that an individual or organization is making in acting according to a set of desired values.

SUMMARY OF THE INVENTION

The techniques of the invention measures discrepancies between human value systems by selecting a set of values and having entities such as individuals or organizations make a hierarchy of the values by giving each value a rating number that indicates a rating in the hierarchy. A rating number may be any value upon which arithmetic operations may be performed. The rating numbers given to the values are compared to understand how a first entity's values relate to a second entity's values. In order to facilitate computation and comparison, in a preferred embodiment, each value is associated with one rating number in a predetermined range of rating numbers, a fixed number of values is associated with each rating number, and the number of values that have a given rating number decreases towards the ends of the predetermined range.

The techniques may be used to investigate discrepancies for the purpose of determining the "fit" between individuals, between individuals and communities, and between communities. They may also be used to measure changes in values over time and to measure differences between the current values of individuals or communities and desired values for the individuals and communities.

Values and ratings that are predictive of attaining a desired result may be found by providing a set of values that appear to be relevant to attaining the desired result to a group of entities and having them make a hierarchy of the values as well as providing an estimate of how well they have reached the desired result. Values that show a high correlation to attaining the desired result are retained and the process is repeated with new values until a sufficient number of values have been found. The values and rating numbers for the last iteration have a high correlation to attaining the desired result and may be used to determine how entities are progressing towards acquiring values that will aid them in attaining the desired result.

Other objects and advantages will be apparent to those skilled in the arts to which the invention pertains upon perusal of the following Detailed Description and drawing, wherein:

BRIEF DESCRIPTION OF THE DRAWING

FIG. 3 shows rules for discrepancy measurement that may be used in a match-making system;

FIG. 4 shows the set of values employed in the match-making system;

Figure 1:
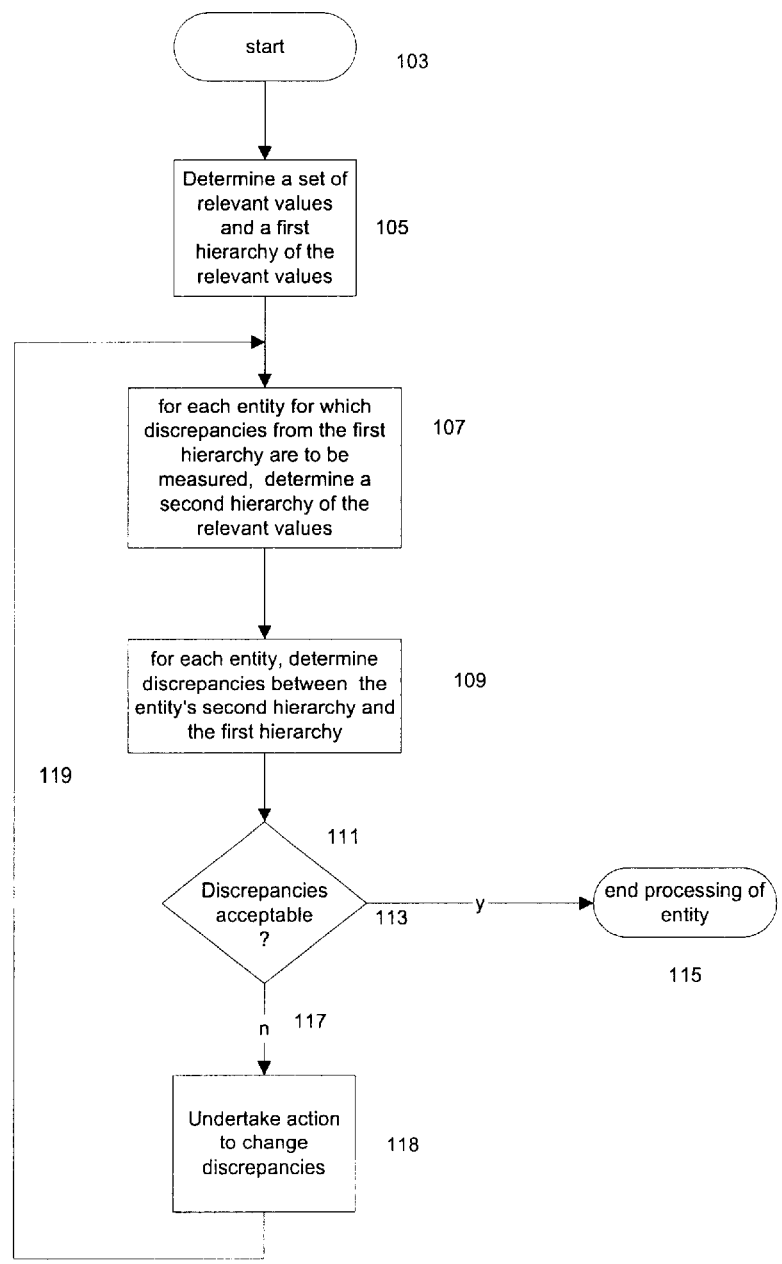
FIG. 1 is a flowchart of how measurement of discrepancies in human value systems may be used to effect change in human entities.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first present an overview of the techniques for objectively determining discrepancies in human values and their applications, will give a detailed example of how the techniques may be employed in match making, will then show how relevant values may be discovered, and will finally summarize other applications. In the following, the techniques will often be termed CONNECT.

Figure 2:
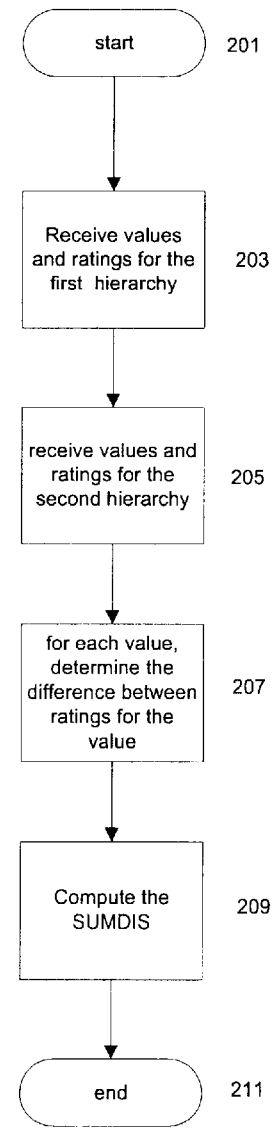
FIG. 2 is a detailed flowchart of how discrepancies in value systems are computed in a preferred embodiment.

Contexts in which Value Discrepancies are Used: FIGS. 1 and 2

Generally speaking, systems that compute value discrepancies operate according to high-level flowchart 101 of FIG. 1. As shown there beginning at 103, the first step (105) is to determine a set of values that is relevant to the entity or entities being worked with. The relevance may be either positive or negative and the values may all have the same weight or may be given different weights. The values may have many sources. They may be values that the entity aspires to or that the entity currently has.

Then, at 107, each of the entities whose value discrepancies are being computed makes a hierarchy of the values by assigning each value a rating belonging to a range of ratings. Since the system computes value discrepancies, the ratings must be represented by arithmetic values. In a preferred embodiment, the ratings are represented by a range of integers. The arithmetic values that represent the ratings are termed herein rating numbers, and when the term rating is used in the following, what is meant is the rating number representing the rating. The lowest rating indicates that the value to which the rating is assigned is least relevant to the entity and the highest rating indicates that the value assigned to it is most relevant to the entity. Of course, the meaning of the range may be reversed. In a preferred embodiment, the ratings are assigned to the values in such fashion that a normal distribution results, with the number of values that have a given rating increasing as the middle of the range of ratings is reached.

Then, as shown at 109, for each pair of entities for which discrepancies are to be measured, the discrepancies between the entities' hierarchies are measured. To measure the discrepancies for a pair of entities, one simply proceeds as shown in FIG. 2: taking the ratings for the values from the hierarchy for one member of the pair (203) and the ratings for the values from the hierarchy for the second member of the pair, (205), one finds for each value the absolute value of the difference between the ratings (207). Then the differences are summed for all of the values (209). If the values are weighted, the summing will take the weights into account. The result of the summing is the SUMDIS, or sum of the discrepancies. The smaller the SUMDIS is, the smaller the difference between the values of the pair of entities and the greater the sum, the greater the difference. It should be noted here that because the sum measures difference, the sum may be used either to determine whether there is a "good fit" between the entities that made the hierarchies of values, if that is what is desired, or whether there is not a "good fit", if that is what is desired.

If the discrepancies between the pair's hierarchies have a level which is acceptable for the overall process, the processing of the entity ceases (decision block 111, branch 113, terminal block 115). Otherwise, action is taken to change discrepancies in the desired fashion (branch 117 and block 118) and when the action is finished, the process repeats itself (loop 119).

Using CONNECT in Matchmaking: FIGS. 3–6

Participants in successful long-term relationships generally have similar values. Thus, one area where the techniques for determining discrepancies in values is important is in matchmaking. In general, the smaller the discrepancies in values, the better the prospects for the match. FIGS. 3–6 show pages of a spreadsheet program which permits a person who is looking for a match to input a first hierarchy of values for him or herself and a second hierarchy of values for the ideal partner. The process just described is then used to compare the "ideal other" hierarchy for a given individual with the "self" hierarchy of each potential partner. The "self" hierarchy that yields the smallest SUMDIS when compared with the given individual's "ideal other" hierarchy belongs to the best potential match.

FIG. 3 has the rules 301 for participating in the matchmaking and two buttons. When the participant clicks on button 303, form 501 for the "ideal other" hierarchy appears; in FIG. 5 appears; when the participant clicks on button 305, form 601 for the "self" hierarchy appears. The values used in the forms are shown in FIG. 4 at 401. There are 18 values for this application, each of which is identified by a letter of the alphabet. At the bottom of the spreadsheet page of FIG. 4 are two buttons, 403 and 405, which permit the participant to return to form 501 and form 601.

Figure 5:
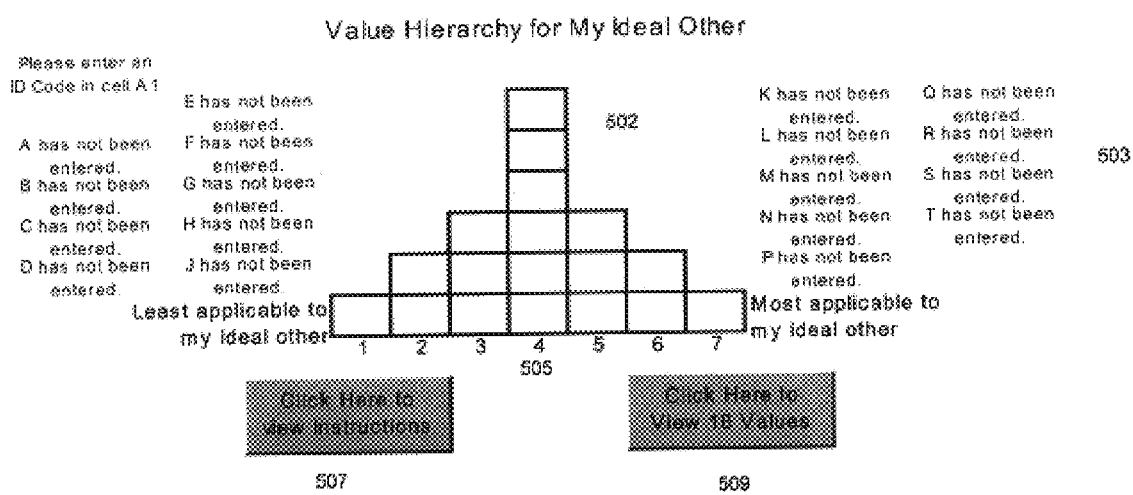
FIG. 5 shows a spreadsheet used to assign ratings to values for the ideal other.
Figure 6:
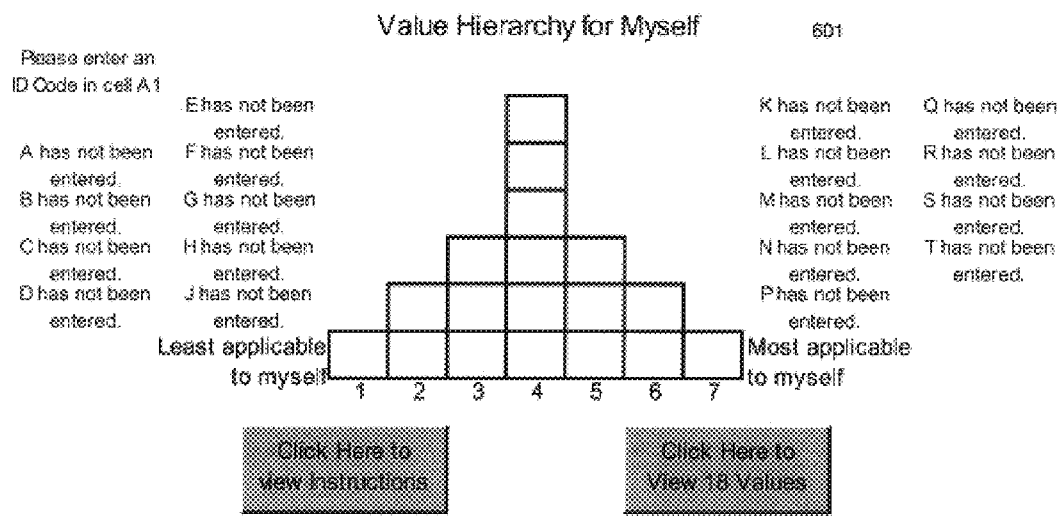
FIG. 6 shows a spreadsheet used to assign ratings values for oneself.

Continuing with form 501 in FIG. 5, there are 7 ratings 505 which may be assigned to the 18 values of FIG. 4. Pyramidal structure 502 assures that the values are assigned such that a normal distribution results. The participant fills out the form by putting each of the letters representing a value into a box that corresponds to its rating. Thus, if the value "Unique" is the least relevant value for the participant's "ideal other", it goes in the box above rating 1; if "Interdependent" is the most relevant value, it goes in the box above 7; if "Powerful", "Effective", "Efficient", and "Respected" are in the middle of the hierarchy, they go in the boxes above rating 4, and so forth. The messages at 503 keep track of which letters have not yet been entered. Clicking on button 507 returns the user to the instructions of FIG. 3 and clicking on button 509 returns the user to the values of FIG. 4. As pointed out in the Rules of FIG. 3, the best way to fill out the form is to begin at the ends and work towards the middle. It should be pointed out here that an advantage of doing the rating in the fashion required by form 501 is that the standard deviation for the ratings for a given kind of form is always the same.

Form 601 works in exactly the same way as form 501, except that the participant fills it in with the value hierarchy for "self". When each participant has filled in both forms, the spreadsheet has a "self" hierarchy and an "ideal other" hierarchy for each participant, and can compare each participant's "self" hierarchy with the "ideal other" hierarchy of all of the other participants. If there is a perfect match between the hierarchies for a pair of participants, the differences between the ratings for the values will be 0, as will SUMDIS. Otherwise, in general, the greater the value of SUMDIS, the less good the match. When actually making a match, one would typically choose a pair such that the total SUMDIS for the pair was minimized. Of course, where there is otherwise a good match but there are large differences in the ratings for a couple of values, the discrepancies could be used as a starting point for discussion and counseling.

Those familiar with interactive computer technology will understand that matchmaking as described above could be done using any system which permits collection of data from an entity and processing of that data. For example, the forms of FIGS. 5 and 6 could be easily adapted for use in the World Wide Web, with the forms being Web pages that the user fills out on his or her browser and returns to a Web server. An application program on the server performs the computations necessary to compute SUMDIS for pairs of participants. When the application program finds a pair with a small SUMDIS, it can email each member of the pair the contact information for the other member. The contact information can include any relevant information about the member of the pair, including a picture.

Finding the Right Values

It will be apparent from the foregoing that the quality of the results obtained by comparing ratings are strongly dependent on the relevance of the values for the purpose for which they are being used. One source of values is of course experience; another is the self-examination of the community in which the techniques described herein are to be used. In both cases, CONNECT can aid in discovering the most relevant values. In the present context, a community can be any formal or informal grouping of human beings.

Figure 7:
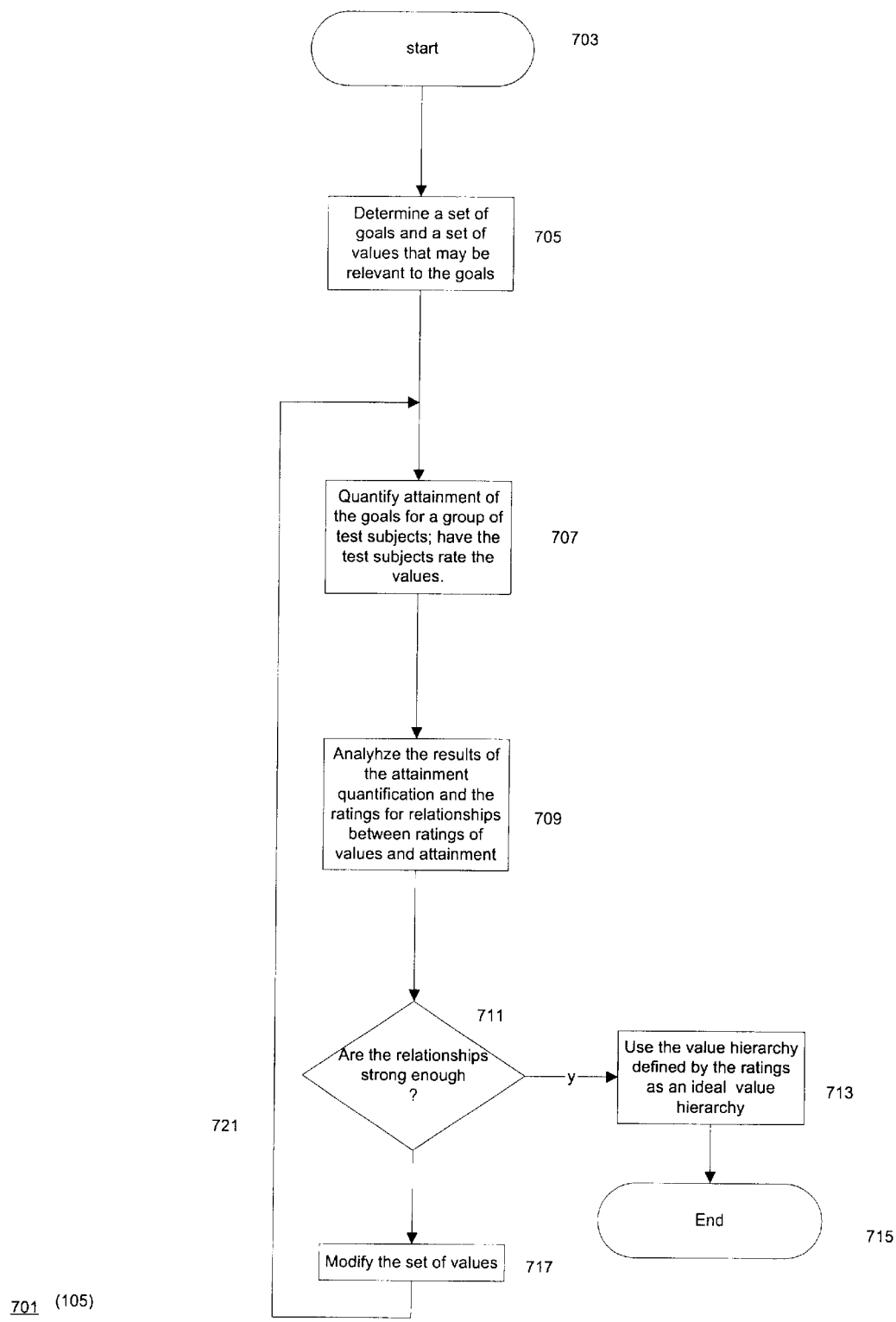
FIG. 7 is a flowchart of a method of discovering relevant values.

Finding the Right Values by Experience: FIG. 7

One way of finding the right values for matchmaking is to establish a trial set of values like the ones used above for matchmaking, take people who are involved in long-term relationships, and have each indicate the nature of the relationship (marriage, sibling, parent-child, business partner, and so on) and how satisfied he or she is with it. To do the latter, the person participating in CONNECT selects one of a range of numbers, as was done with rating. Satisfaction is of course the goal of the long-term relationship, so the satisfaction rating indicates the extent to which the goal has been reached. The person also ratings the values for him or herself and for the partner, as previously indicated.

Then a canonical correlation (CANCORR) is run on the data thus obtained from at least fifty pairs in a given kind of long-term relationship. In the canonical correlation, each independent variable is the discrepancy on one of the 18 rating discrepancies, and the dependent variables (or factors) are the sum and the difference in their SATISFACTION ratings. This yields regression weights for each of the independent and dependent variables. Any good statistics program for a PC with lots of memory includes CANCORR. The output of CANCORR is:

$$aV_1+b_2+\ldots+s_{18}=x_{SUMSAT}+y_{DIFSAT}$$

where a, b, etc. are the relative weights of those 18 independent variables in predicting the best combination of the two factors, SUMSAT and DIFSAT, and x and y are the relative importance of those two SATISFACTION ratings. By using this technique, one can determine the relative relevance of the values in a set for determining a good match (or a bad one) and can alter the values in the set or their weights accordingly. The process just described can continue, with values that are not predictive of SATISFACTION ratings being discarded and others being added, until all of the values are predictive. The ratings of the values resulting from the last iteration of the process can be used as ideal ratings.

FIG. 7 is a generalized flowchart 701 of the process just described for the matchmaking application of CONNECT. It is one embodiment of element 105 of FIG. 1. Beginning at 703, the first step (705) is to determine a set of goals and a set of values that may be relevant to the goals; the next step (707) is to quantify attainment of the goals for a group of test subjects and then have the test subjects rate the values. Then, at 709, the results of the attainment quantification and ratings from step 707 are analyzed to find relationships between ratings of values and attainment of the goals. At decision block 711, it is determined whether the relationships between the ratings of the values and the attainment of the goals are strong enough. If they are, the branch to block 713 is taken, the value hierarchy defined by the ratings is used as an ideal value hierarchy, and the process ends at 715. If they are not, the branch to block 717 is taken, the values are modified, and loop 721 is taken back to block 707.

Finding Values by Community Self-Examination

One use of the techniques for objectively measuring value discrepancies is in forming communities, either actual ones or virtual ones whose members interact by mechanisms such as the World Wide Web. Any community can choose to accept a previously developed set of value hierarchies, or, if they prefer, they can create their own values and hierarchies. Every community is a multi-faceted culture with an abundance of measurable items. When these items are identified, they can be converted into values. The Value Creation seminar is an actual or virtual gathering place where the community congregates to define the beliefs that reflect the lifestyle of the community. Once the values are identified, the effect they have on how the community behaves can be measured using the techniques just described for finding values relevant to successful long-term relationships.

Value Creation Seminars

There are two Value Creation Seminars, the Interpersonal Value Creation Seminar and the Community Value Creation Seminar. Each provides a place, virtual or real, where community members come together to discuss and develop multiple values that can be assembled into hierarchies and compared with other hierarchies for the values.

The Interpersonal Value Creation Seminar provides a forum for generating values essential to forming the community or matching and pairing within the community. The Community Value Creation Seminar is designed to create values vital to the community. This seminar should produce the values that reflect the ideals of the community.

The value creation process should begin with at least twice as many values as will be required for the hierarchy. The following steps can assist in Value Creation:

1. Community agrees to use CONNECT.
2. Community identifies values that appear to be relevant to attaining the community's goals.
3. Community provides all values they currently measure or want to measure.
4. Community provides all data on these values.
5. Community decides how often the measurement must be made (weekly, monthly);
6. CONNECT is used to identify weights of certain variables in predicting attainment of goals
7. CONNECT is used to classify clusters of values for the Community
8. CONNECT is employed by the Community to discover best weighted combinations of values for predicting goal attainment.
9. Community is presented with a new hierarchy of values.
10. Community determines which current values need to be less discrepant with the new hierarchy while producing more suggestions for values Value Refinement The value refinement process begins with 20–44 values. The refinement process is intended to reduce the values to the 10–22 values that are relevant to attaining the goal. When values are created and refined properly, they yield different weights. These weights are based on community perceptions. Sometimes these perceptions recognize two or three values that the community sees as being related. Resolving this process online creates a powerful community-building tool.

The Value Refinement Process Involves Seven Steps

1. The Value Creation Seminar (VCS) begins with values that have been used by previous developers of sets of values
2. The VCS selects 28 or more values as an initial set, adding values not necessarily on any previous set
3. The VCS creates a pyramid of the size needed to accommodate the number of values created.
4. The VCS obtains hierarchies of those values from at least as many sources as there are values. Each source also indicates the extent to which the goals were reached for the source;
5. A correlation matrix of every value's ratings with those of every other value is computed.
6. The correlation matrix is then analyzed to determine which of the goals are significantly affected by the values. A goal that is significantly affected by one or more of the values is termed a factor. The analysis also yields the relative weight of each value in affecting each factor
7. Create a new set of values by
   a. labeling each factor with a word or phrase that seems to best describe the combination of values that are relevant to each factor and the relative weights of the factor for the value.
   b. eliminating all values not relevant to any factor
   c. If the number of factors n is fewer than 10, select the values that have the least good fits with the existing factors and repeat steps 3–6 above.

In the matchmaking example, each value is expressed by a single word, or term. In some cases, the community may not be able to represent a value with a single term, but may instead represent it with several terms. The terms that represent the value may also be weighted. The total of the weights will be 100%. For instance, a community developing its own set of values for Interpersonal CONNECT finds three related values, SMART, INTELLIGENT, and EXPERIENCED, and weights them, giving SMART 60%, INTELLIGENT 20%, and EXPERIENCED 20%. The community may further attempt to reduce these terms by finding a single term to express the value. SMART, INTELLIGENT AND EXPERIENCED, for example, could be expressed with the single term WISE. The community can then submit their new terms to be posted and assembled on a Web bulletin board that the community uses to collaborate on value selection and term reduction.

When the community has completed the process, the result is a revised set of values and NOW or SLF hierarchies for the values that reflect the community at this point in time. The final step is to see how the values relate to different dimensions. The dimensions include:

Purposing values that describe how the entity does things. An example of such a value is CREATIVE.
Goaling values that describe an end state that the entity wishes to attain. An example here is SUCCESSFUL.
Cognitive values that describe an intellectual state of the entity. An example is WISE.
Social values that describe how the entity relates to others. An example here is HELPFUL.

A value may relate to more than one dimension.

Development of Value Hierarchies

Once values are defined, the hierarchies must be made. The following steps set up the assignment of hierarchies to the values.

1. Define the community in terms that operationalize the behaviors involved
2. Translate the behaviors into measurable values
3. Examine the value intercorrelation matrix to ensure values are distinct from one another
4. Convert values into a structure that can be used to assign ratings to the values. In the preferred embodiment, the structure also ensures a normal distribution of the ratings.
   If 10 values are selected, then use a 1-2-4-2-1 structure
   If 12 values are selected, then use a 1-2-6-2-1 structure
   If 14 values are selected, then use a 1-3-6-3-1 structure.
   If 16 values are selected, then use a 1-2-2-6-2-2-1 structure
   If 18 values are selected, then use a 1-2-3-6-3-2-1 structure
   If 20 values are selected, then use a 1-2-4-6-4-2-1 structure
   If 22 values are selected, then use a 1-2-4-8-4-2-1 structure
5. Finalize selection of CONNECT values Other Applications of the Techniques The techniques can be used in any situation where it makes sense to apply a set of values to a set of at least two entities, rating the values for each of the entities, and then comparing the ratings for each of the entities. Two broad classes of applications are those which use the techniques to measure "fit" between entities at a present time and those which use the techniques to measure changes in values over time. Of course, an application may do both, for example, the application may measure how "fit" changes over time. Some example applications follow.

Matching Individuals to Each Other

The techniques described above for matching individuals romantically can be used for matching them for any purpose, with the values being chosen to suit the purpose.

Matching an Individual to a Community

What is needed here are a hierarchy of values for the ideal community member and a hierarchy of the same values provided by the individual in question. Comparison of the ratings is done as described above. If what is sought is an individual who is a "good fit" with the community, people with low SUMDIS's are preferred; if what is sought is an individual who brings diversity to the community, people with high SUMDIS's are preferred. The values of the hierarchy can be found by means of a Value Creation Seminar as described above; the ratings for the ideal community member could be assigned as a result of discussions among present members of the group or found by having the present members submit their ratings and using some technique such as averaging to aggregate the members' ratings.

Measuring an Individual's Progress in Acquiring the Values of a Community

Here, the community establishes a value hierarchy that expresses the community's values and has a member of the group make and submit his or her own value hierarchy. The SUMDIS will show the degree to which the individual has acquired the community's values. Analysis of differences in individual ratings will show where further work is needed.

Using the Techniques with Communities

Differences in organizational values are a problem whenever two communities merge. The techniques can be used to discover and quantify the differences. If the communities to be merged already have ideal value hierarchies, those can be used as described for individuals above; otherwise, a community value hierarchy can be made by aggregating the value hierarchies submitted by the community members. Techniques analogous to the "self" and "ideal other" hierarchies for individual matching can also be used. When one of the merged communities provides the dominant values, the techniques may be used to monitor how well the subordinate merged community is acquiring the values of the dominant community. A community may also wish to establish an ideal value hierarchy that expresses what the community wishes to attain; the techniques may be used in such a situation to monitor how well the community is doing at attaining the ideal value hierarchy.

Using the Techniques to Discover Values

With both individuals and communities, the techniques may be used to discover relevant values and ratings as described above with regard to finding a value hierarchy that is relevant to matchmaking.

An Example of Using CONNECT to Establish an Ideal Hierarchy of Values and then Measure the Progress of Individuals in Attaining the Ideal Hierarchy In this example, the goal is to improve the performance of a company's sales staff. What is particularly desired is a sales staff that is not only effective but is also loyal to the company. The first step is to identify sales people who are both loyal and high-performing. The next step is to find a set of values that are relevant to the factors of loyalty and high performance. This can be done by asking the high performers to collaborate in finding such values. CONNECT can be used during the process of finding the values to test the relationship between the proposed values and the factors. When a suitable set of values is found, the high performers can make value hierarchies and an ideal value hierarchy may be made by aggregating the value hierarchies provided by the high performers. Everyone in the sales staff may then make value hierarchies and these can be compared with the ideal value hierarchy to determine which salespeople need to work on their values. A program to change the salespeople's values in the desired fashion can then be undertaken, with the salespeople in question making new values hierarchies to measure their progress.

Using MASTERY with CONNECT

MASTERY is a learning technique described in U.S. patent application Ser. No. 09/399,908, Heinberg, et al., Techniques for mastering a body of knowledge by writing questions about the body of knowledge, filed Sep. 20, 1999, now U.S. Pat. No. 6,364,667, CONNECT can be used to relate the knowledge acquisition measured by MASTERY with a set of values. In MASTERY, the learner performs in three roles: as a writer of test questions (SOURCE), an answerer of test questions (RESPONDENT), and a predictor of the quality of test questions (EVALUATOR). Learners have scores for each of the roles, and ratings of values provided by the learners can be used to determine whether there are relationships between ratings and scores in the roles. Moreover, regressing learning scores with pairing scores against measures of community growth enables a learning community to predict future directions based on learning performance and shared values.

CONCLUSION

The foregoing Detailed Description has disclosed to those skilled in the relevant technologies how to make and use the inventors' techniques for relating values to goals and purposes and for determining discrepancies in value systems as well as the inventors' techniques for using measurement of discrepancies in value systems to determine how two entities "fit" together, how an entity's values relate to a desired set of values, and how an entity's values change over time. The inventors have further disclosed the best mode presently known to them of implementing their techniques. It will be apparent to those skilled in the relevant arts that the inventors' techniques can be implemented using any method of assigning ratings in a hierarchy to values where the ratings are represented by values upon which arithmetic operations can be performed. It will further be apparent that there are many different ways of obtaining the ratings and operating on them to obtain meaningful results and that there are many applications in addition to the ones disclosed herein for the techniques.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of employing a computer system to determine how a first entity relates to a second entity with regard to a set of values, the method comprising the steps of:

for each entity, receiving inputs into the computer system that indicate for each value in the set thereof a rating number indicating a position which the entity has assigned the value in a hierarchy; and in the computer system, comparing for each value the rating numbers for the entities for that value to obtain a comparison result and using the comparison result to determine how the first entity relates to the second entity.

2. The method set forth in claim 1 wherein:

the rating numbers belong to a predetermined range; and in the step of receiving inputs, for each entity, each value is associated with one rating number.

3. The method set forth in claim 2 wherein:

a fixed number of values is associated with each rating number.

4. The method set forth in claim 3 wherein:

the number of values that have a given rating number decreases towards the ends of the predetermined range.

5. The method set forth in claim 4 wherein:

in the predetermined range, the rating number at one end of the range indicates a value that is least important to the entity and the rating number at the other end of the range indicates a value that is most important to the entity.

6. The method set forth in claim 1 wherein:

in the step of comparing, for each of the values, the difference between the rating number of the value for the first entity and the rating number of the value for the second entity is determined and the differences are added to produce the comparison result.

7. The method set forth in claim 1 wherein:

the first entity and the second entity are individuals and the comparison result indicates whether the individuals will be good matches for each other.

8. The method set forth in claim 7 wherein:

for each of the individuals, the step of receiving inputs receives a first set of rating numbers indicating how the individual applies the values to himself and a second set of rating numbers indicating how the individual applies the values to his or her ideal partner; and in the step of comparing, each rating number in the first set of rating numbers for one of the individuals is compared with the corresponding rating number in the second set of rating numbers for the other individual.

9. The method set forth in claim 1 wherein:

the first entity is an individual being and the second entity is a community; and the comparison result is used to determine differences between the individual's values and the community's values.

10. The method set forth in claim 9 further comprising the step of:

using the differences to determine whether the individual should join the community.

11. The method set forth in claim 9 further comprising the step of:

using the differences to determine how the individual is progressing in acquiring the values of the community.

12. The method set forth in claim 1 wherein:

the first and second entities are communities that are considering a closer association and the comparison result indicates whether the closer association is desirable.

13. The method set forth in claim 1 wherein:

the first and second entities are communities and the comparison result indicates how one of the communities is progressing in acquiring the values of the other.

14. The method set forth in claim 1 wherein:

the first and second entities are a single entity;

the values and ratings for the first entity represent an ideal set of values and ratings for the single entity; and the values and ratings for the second entity represent current ratings for the values for the single entity.

15. The method set forth in claim 14 wherein:

the comparison result indicates how the single entity is progressing in acquiring the ideal set of ratings.

16. The method set forth in claim 15 wherein:

the single entity is an individual.

17. The method set forth in claim 15 wherein:

the single entity is a community.

18. The method set forth in claim 1 wherein:

the first and second entities are a single entity;

the values and ratings for the first entity represent a set of values and ratings for the single entity at a first point in time; and the values and ratings for the second entity represent ratings for the values for the single entity at a second point in time.

19. The method set forth in claim 18 wherein:

the comparison indicates how the entity's values have changed in the interval between the first and second points of time.

20. The method set forth in claim 19 wherein:

the single entity is an individual.

21. The method set forth in claim 19 wherein:

the single entity is a community.

22. The method set forth in claim 1 wherein at least one of the entities is a community of one or more individuals and the method further comprises the steps of:

for each individual in the community, receiving inputs into the computer system that indicate for each value in the set thereof a rating number indicating a position which the individual has assigned the value in the hierarchy; and determining the community's rating number for each value by aggregating the rating numbers indicated for the value by the individuals.

23. A method of employing a computer system to find a hierarchy of values that is relevant to attaining a desired result, the method comprising the steps of:

for a plurality of entities, receiving inputs into the computer which indicate the extent to which the entity has attained the desired result and a hierarchy which the entity gives values in a predetermined set thereof;

using the computer to find correlations between ratings of values in the hierarchies and the extent to which entities have attained the desired result;

retaining values whose ratings show a high correlation with attaining the desired result and discarding others that do not;

repeating the foregoing three steps with new values in addition to the retained values until a sufficient number of values whose ratings have a high correlation have been acquired; and using the values and rating numbers therefore from the last iteration as the hierarchy that corresponds to the desired result.

\* \* \* \* \*